(12) United States Patent
Rolain

(10) Patent No.: US 9,598,020 B2
(45) Date of Patent: Mar. 21, 2017

(54) REAR ASSEMBLY FOR A MOTOR VEHICLE AND ASSOCIATED MOTOR VEHICLE

(71) Applicant: Faurecia Innenraum Systeme GmbH, Hagenbach (DE)

(72) Inventor: David Rolain, Roppenheim (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 52 days.

(21) Appl. No.: 14/433,534

(22) PCT Filed: Apr. 10, 2013

(86) PCT No.: PCT/EP2013/070688
§ 371 (c)(1),
(2) Date: Apr. 3, 2015

(87) PCT Pub. No.: WO2014/053630
PCT Pub. Date: Apr. 10, 2014

(65) Prior Publication Data
US 2015/0224938 A1 Aug. 13, 2015

(30) Foreign Application Priority Data
Oct. 5, 2012 (EP) .................................. 12306218

(51) Int. Cl.
*B60N 3/00* (2006.01)
*B60R 5/04* (2006.01)
*E05D 7/12* (2006.01)

(52) U.S. Cl.
CPC ........ *B60R 5/044* (2013.01); *E05D 2007/128* (2013.01)

(58) Field of Classification Search
CPC ......................... B60R 5/044; E05D 2007/128
See application file for complete search history.

(56) References Cited

FOREIGN PATENT DOCUMENTS

| | | |
|---|---|---|
| DE | 102009058570 A1 | 1/2011 |
| EP | 0332059 A1 | 9/1989 |
| WO | 9632301 A1 | 10/1996 |

OTHER PUBLICATIONS

International Search Report for application No. PCT/EP2013/070688, dated Oct. 28, 2013, 2 pages.
Written Opinion for application No. PCT/EP2013/070688, dated Oct. 28, 2013, 6 pages, not translated.
EP Search Report for application No. EP12306218.4, dated Feb. 25, 2013, 7 pages, not translated.

*Primary Examiner* — Lori L Lyjak
(74) *Attorney, Agent, or Firm* — Reising Ethington P.C.

(57) ABSTRACT

The rear assembly (10; 110; 150) according to the invention comprises at least one lateral lining (18), intended to laterally delimit a motor vehicle trunk (12).
It comprises a mechanism (22) for guiding the rotation of a tray (20) for supporting objects around a transverse axis (A-A'), relative to the lateral lining (18).
For each lateral lining (18), the guide mechanism (22) comprises an insertion member (60) for at least one edge (42, 46) of the tray, the insertion member (60) being rotatably mounted around the transverse axis (A-A') on the lateral lining (18).

20 Claims, 3 Drawing Sheets

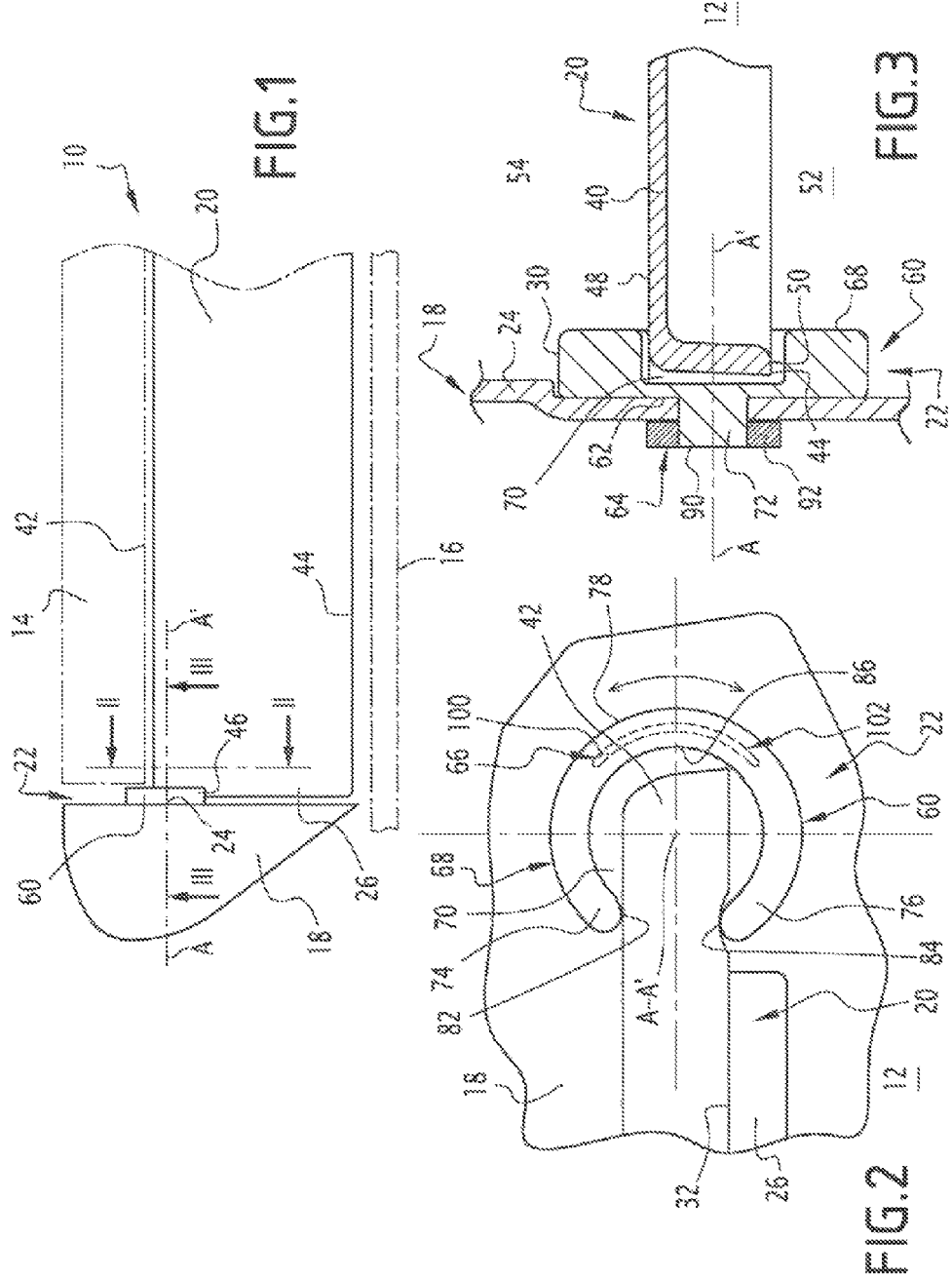

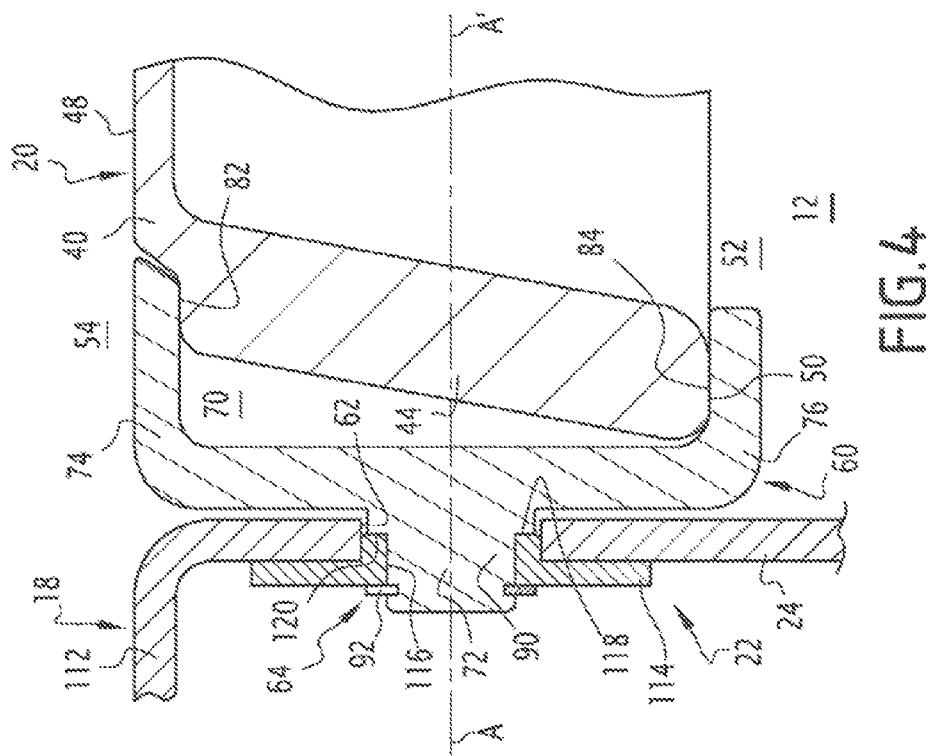
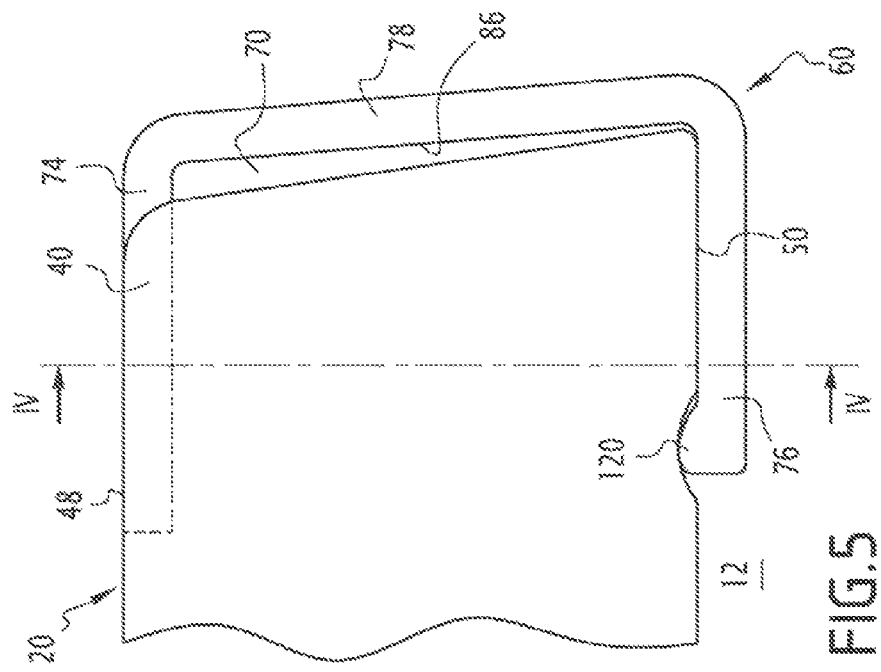

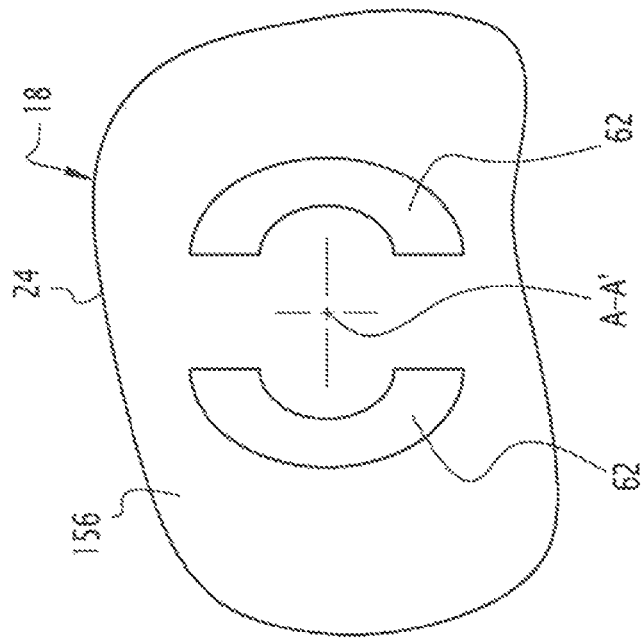
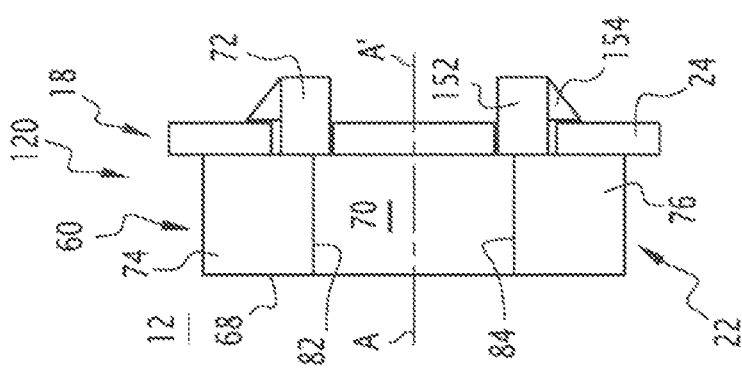
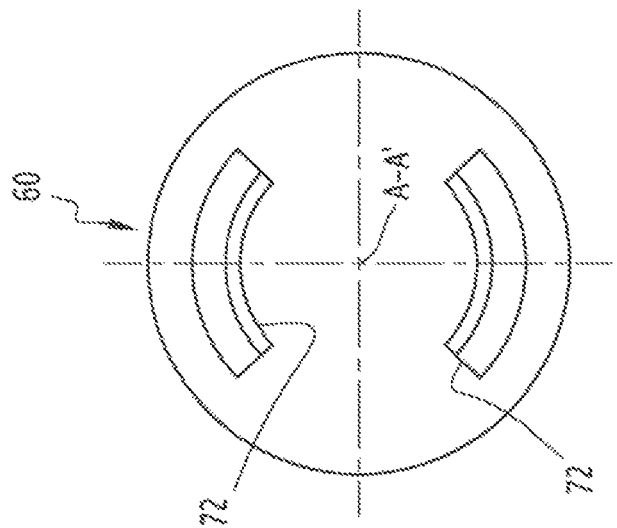

REAR ASSEMBLY FOR A MOTOR VEHICLE AND ASSOCIATED MOTOR VEHICLE

TECHNICAL FIELD

The present invention relates to a rear assembly for a motor vehicle, comprising:
- at least one lateral lining, intended to laterally delimit a motor vehicle trunk;
- a mechanism for guiding the rotation of a tray for supporting objects around a transverse axis, relative to the lateral lining.

BACKGROUND

Such an assembly is designed to receive a tray transversely articulated between the flanks of the motor vehicle to separate the trunk into a lower compartment, in which objects present in the trunk are hidden by the tray, and an upper compartment, in which objects can be supported by the tray.

When the truck is opened, the tray is inclined relative to its horizontal idle position bearing on the lateral linings, either through a manual action by the user or by cords connecting the tray to the hatchback.

To assemble a tray of this type in the lateral linings of the vehicle, it is known to use a guide mechanism comprising transverse axes attached on either side of the tray around its axis of rotation. The axes are inserted into complementary cylindrical housings arranged in the lateral linings of the vehicle. A tray adapted for such a rear assembly is expensive to manufacture.

To reduce the cost of the tray, FR 2,850,917 proposes a tray with no axes passing through its axis of rotation. This tray laterally comprises a first stop surface cooperating with a complementary stop surface secured to supports, during pivoting of the tray.

The tray further comprises a retaining surface cooperating, at the end of travel of the tray, with a complementary retaining surface. The tray is inserted into the lateral linings by inclining it with respect to its horizontal position.

Then, when a fraction force oriented at least partially toward the front of the vehicle is exerted, the tray pivots to its inclined end-of-travel position. This tray is actuated manually.

Such a tray is therefore satisfactory when the actuating force of the tray is continuously oriented toward the front of the motor vehicle.

However, when the tray is manually operated to cause it to go from its horizontal position to its inclined end-of-travel position, there is a high risk of it leaving the lining, for example when the user pulls the tray backward by raising it.

If the user closes the hatchback again without verifying that the tray is positioned properly, said tray can break.

As a result, trays with no axis can be perceived by the vehicle's user as being fragile and of lower quality.

SUMMARY

One aim of the invention is therefore to obtain a rear assembly that makes it possible to receive a tray for supporting objects robustly and reliably, without increasing the cost or complexity of the tray.

To that end, the invention relates to a rear assembly of the aforementioned type, characterized in that for each lateral lining, the guide mechanism comprises an insertion member for at least one edge of the tray, the insertion member being rotatably mounted around the transverse axis on the lateral lining.

The assembly according to the invention may comprise one or more of the following features, considered alone or according to any technically possible combination:
- the insertion member comprises a stirrup delimiting an insertion passage for the tray;
- the stirrup delimits an upper surface and a lower surface defining the insertion passage between them, the tray being able to be gripped between the upper surface and the lower surface, the stirrup advantageously defining a front axial stop surface of the tray;
- the insertion member protrudes transversely toward the inside of the trunk relative to the lateral lining;
- the guide mechanism defines a transverse guide orifice arranged through the lateral lining, the insertion member comprising at least one guide protrusion engaged through the through orifice;
- the guide protrusion extends along the transverse axis;
- the guide protrusion is off-centered relative to the transverse axis;
- the guide mechanism comprises a transverse retaining member for retaining the insertion member on the lateral lining;
- the guide mechanism comprises an assembly for limiting the rotational travel of the insertion member around the transverse axis;
- the insertion member is rotatably mounted around the transverse axis between a configuration keeping the tray in an idle position, in which the tray is substantially horizontally maintained, and a configuration for keeping the tray in a position for accessing the trunk, in which the tray is inclined relative to the horizontal, the guide mechanism advantageously comprising an elastic biasing member for biasing the insertion member toward its idle position;
- the guide mechanism comprises a contact member for contact with the insertion member, mounted stationary on the lateral lining, the contact member advantageously having a friction coefficient with the insertion member of less than 0.05;
- it comprises a tray for supporting objects, at least one edge of the tray being engaged in each insertion opening such that it can be released;
- it comprises two opposite lateral linings, delimiting the trunk between them, the guide mechanism comprising two members for inserting at least one edge of the tray, each insertion member being rotatably mounted around the transverse axis on a respective lateral lining;
- the tray comprises a first corner inserted into a first insertion member and a second corner inserted into a second insertion member;
- the travel limiting assembly comprises a slug secured to one of the insertion member and the lateral lining, and a groove secured to the other of the insertion member and the lateral lining, the slug being received in the groove.

The invention also relates to a motor vehicle comprising a rear assembly as defined above.

The vehicle may comprise the following feature:
- the lateral lining delimits a trunk of the motor vehicle, the insertion member protruding transversely in the trunk relative to the lateral lining.

BRIEF DESCRIPTION OF THE DRAWINGS

The invention will be better understood upon reading the following description, provided solely as an example and done in reference to the appended drawings, in which:

FIG. 1 is a partial top view of a first rear assembly according to the invention;

FIG. 2 is a diagrammatic view, in partial cross-section along plane II, of the rear assembly of FIG. 1;

FIG. 3 is a diagrammatic view, in partial cross-section along plane III, of the rear assembly of FIG. 1;

FIG. 4 is a view similar to FIG. 3 of a second rear assembly according to the invention;

FIG. 5 is a view similar to FIG. 2 of the second rear assembly according to the invention;

FIG. 6 is a view similar to FIG. 3 of a third rear assembly according to the invention;

FIG. 7 is a side view of an insertion member of the third rear assembly according to the invention; and FIG. 8 is a side view of the lateral lining of the third rear assembly according to the invention.

DESCRIPTION OF THE ILLUSTRATED EMBODIMENT

Hereinafter, the orientations used are the typical orientations of a motor vehicle. Thus, the terms "rear", "front", "upper", "lower", "outer", "inner", "longitudinal", "transverse", "left" and "right" are to be understood in reference to the normal travel direction of the motor vehicle and the position of a driver.

A first rear assembly 10 of a motor vehicle according to the invention is illustrated by FIGS. 1 to 3.

The rear assembly 10 delimits a trunk 12 of the motor vehicle, shown in FIGS. 2 and 3. The trunk 12 is for example designed to receive objects, such as luggage or merchandise.

In a known manner, the rear assembly 10 comprises a floor (not shown) delimiting the trunk 12 in the downward direction, a seat 14 axially delimiting the trunk 12 toward the front and a hatchback 16 axially delimiting the trunk 12 toward the rear.

According to the invention, the rear assembly 10 comprises two opposite lateral linings 18 (one of which is visible in FIG. 1), and a tray 20 for supporting objects, rotatably mounted around a transverse axis A-A' between the lateral linings 18, from an idle horizontal position toward an inclined position for accessing the trunk 12.

The rear assembly 10 furthermore comprises a mechanism 22 for guiding the movement of the tray 20 between the idle position and the access position, receiving the tray 20 such that it can be released.

Each lateral lining 18 is fastened on a respective flank (not shown) of the motor vehicle.

The lateral lining 18 comprises a substantially vertical wall 24 laterally delimiting the trunk 12 and, advantageously, a tray support 26 designed to support the tray 20 in its idle position.

In the example illustrated by FIG. 3, the vertical wall 24 has a recess 30 opening into the trunk 12, housing the guide mechanism 22.

The tray support 26 extends behind the mechanism 22, over part of the length of the tray 20.

The tray support 26 delimits a horizontal upper bearing surface 32 for the tray, when it is in its idle position.

The tray 20 comprises a tray body 40 extending substantially in a mean plane. The body 40 comprises a globally rectangular contour, considered in its mean plane.

In reference to FIG. 1, the body 40 extends between the front edge 42 placed near the back seats 14, and a rear edge 44 designed to be placed near the hatchback 16 when the hatchback 16 closes off the trunk 12.

The body 40 further extends transversely over the entire width of the trunk 12 between the planar support 26 of the left lining 18 and planar bearing of the right lining (not shown).

The width of the tray 20, considered between the left edge 46 and the right edge, is greater than the distance separating the respective planar bearings 36 across from each flank 14.

The body 40 of the tray 20 is advantageously made from a thermoplastic material, optionally reinforced by fibers or metal. The body 40 can be covered with a textile such as carpet, a nonwoven or fabric.

It has an upper surface 48, on which objects with a mass greater than several tens of grams can be arranged bearing without significant deformation of the tray.

The body 40 further has a lower surface 50 designed to bear on the planar bearings 36 along the left edge 46 and the right edge.

As specified above, the tray 20 is rotatably mounted relative to the linings 18, by means of the guide mechanism 22, around the transverse axis A-A', between the substantially horizontal idle position and the inclined position for accessing the trunk 12.

The tray 20 can further be moved between a configuration engaged in the guide mechanism 22 and a configuration disengaged outside the mechanism 22, in which the tray 20 can be removed from the trunk 12.

In the horizontal position, the tray 20 is positioned bearing on the planar bearings 36.

It extends over the entire width of the vehicle between the linings 18. In reference to FIG. 3, in the trunk 12, the tray 20 delimits a lower compartment 52 for storing objects that is upwardly hidden by the tray 20 and an upper compartment 54 that is visible from outside the vehicle through a window of the hatchback 18.

In the inclined end-of-travel position, the tray 20 has pivoted around the transverse axis A-A' by moving its rear edge 44 upward and forward. It is then possible to access the inner compartments 52.

According to the invention, the tray 20 has no pivots passing through its axis of rotation A-A'. More generally, no element of the tray 20 protrudes laterally from its left edge 46 or its right edge (not shown) to be engaged in a lining 18.

According to the invention, as shown in FIGS. 2 and 3, the guide mechanism 22 comprises, for each lining 18, a rotating member 60 for inserting at least one edge 42, 46 of the tray 20, mounted on the lining 18, through a guide orifice 62 arranged in the lining 18.

For each insertion member 60, the guide mechanism 22 comprises a member 64 for transversely retaining the insertion member 60 on the lining 18, and advantageously, an assembly 66 for limiting the rotational travel of the insertion member 60 (shown in FIG. 2).

In this example, the mechanism 22 comprises two respective insertion members 60 mounted on the opposite linings 18. The two insertion members 60 are positioned along the transverse axis A-A', across from each other.

Each insertion member 60 protrudes transversely in the trunk 12 from the lining 18 on which it is mounted. It is mounted rotating around the transverse axis A-A' between a configuration keeping the tray 20 in the horizontal idle position and a configuration keeping the tray 20 in the inclined position for accessing the trunk.

Each insertion member 60 comprises a stirrup 68 delimiting a passage 70 for inserting one end of the tray 20, and a rotational guiding protrusion 72 (shown in FIG. 3) inserted through the orifice 62.

The stirrup 68 protrudes in the trunk 12. In this example, it comprises an upper partition 74 and a lower partition 76 for locking the tray 20. It advantageously comprises a front partition 78 connecting the upper partition 74 to the lower partition 76.

In this example, the partitions 74, 76 are curved upward and downward, respectively. The stirrup 68 thus has a C- or U-shaped section, considered in a vertical axial plane of the vehicle.

The passage 70 extends between the partitions 74 to 78. It is upwardly delimited by an upper surface 82 defined below the partition 74, and downwardly delimited by a lower surface 84 defined on the partition 76.

The minimum vertical distance separating the upper surface 82 from the lower surface 84 is substantially equal to the height of the tray 20, considered between the upper surface 48 and the lower surface 50 at the edge 46 of the tray 20 inserted into the passage 70.

Thus, the tray 20 can be gripped between the surfaces 82, 84 in the configuration engaged in the mechanism 22.

The passage 70 is further axially delimited toward the front by a front surface 86 for axial locking, defined on the front partition 78. It is laterally closed off toward the outside by a lateral partition 85.

The passage 70 thus emerges toward the rear between the partitions 74, 76. It laterally emerges toward the inside of the vehicle between the partitions 74, 76, behind the front partition 78.

The guide protrusion 72 protrudes along the transverse axis A-A' toward the outside from the stirrup 68. It is inserted into the guide orifice 62. It has a section, considered in a vertical axial plane of the vehicle, substantially complementary to the section of the guide orifice 62, considered in the same plane.

A free part 90 of the guide protrusion 72 extends outward outside the guide orifice 62, opposite the stirrup 68 relative to the wall 24.

The guide orifice 62 is arranged through the wall 24 of the lining 18. In this example, it extends along the axis A-A'. It crosses through the wall 24.

The orifice 62 has a minimal section, considered in an axial vertical plane of the vehicle, smaller than the maximum section of the stirrup 68, considered in an axial vertical plane of the vehicle.

The retaining member 64 for example comprises a body 92 fastened on the free part 90 of the guide protrusion 72, for example by snapping. The body 92 is advantageously a ring or a clip.

The retaining member 64 transversely locks the insertion member 60 in position, to prevent it from moving outside the orifice 62 by transverse translation toward a central axis of the vehicle.

In reference to FIG. 2, the assembly 66 limiting the travel of the insertion member 60 in this example comprises a slug 100, secured with the retaining member 64, and a groove 102 arranged in the lateral lining 18.

The groove 102 receives the slug 100. Here it is in the shape of an arc of circle. The ends of the groove 102 form angular stops limiting the rotational movement of the retaining member 64 around the transverse axis A-A'.

The operation of the first rear assembly 10 according to the invention will now be described.

Initially, during assembly, the tray 20 is inserted into the insertion passage 70 of each insertion member 64. To that end, the front left corner of the tray 20 is introduced into the insertion passage 70 of the insertion member 60 mounted on the left lining 18, and the front right corner of the tray is introduced into the insertion passage 70 of the insertion member 60 mounted on the right lining (not shown).

The left edge 46 and the right edge (not shown) of the tray 20 are thus gripped between the surfaces 82, 84 of each insertion member 60, to lock the tray 20 in a releasable manner on each insertion member 60.

Traditionally, the tray 20 is advantageously connected to the hatchback 16 by at least one flexible connection.

When the hatchback 16 closes off the trunk 12 toward the rear, the tray 20 is in its horizontal idle position. The lateral edges of the tray 20 are then placed on each tray support 26. The tray 20 then closes off the lower compartment 52 and hides its contents.

When the hatchback 16 is opened, the tray 20 can pivot around the transverse axis A-A' to an inclined position for accessing the trunk 12. Its rear edge 44 lifts and moves forward.

The tray 20 jointly rotates each insertion member 60 around the axis A-A'. The rotational movement of the tray 20 is limited by the assembly 66 limiting the rotational travel, when it is present.

Furthermore, each insertion member 60 keeps the transverse axis of rotation A-A' of the tray 20 in a constant axial position in the vehicle.

The rotational guiding of the tray 20 by the guide mechanism 22 is therefore robust and reliable, which gives the rear assembly 10 structural solidity.

This effect is obtained at a lower cost, since the tray 20 retains a very simple structure, without it being necessary to mount axes or pivots on the tray 20.

When the user wishes to have a continuous space over the entire height of the trunk 12, he removes each corner of the tray 20 outside the insertion passage 70 of the insertion member 60 in which it is retained. The tray 20 then occupies a disengaged configuration of the mechanism 22 and can be removed outside the vehicle.

A second rear assembly 110 according to the invention is illustrated by FIGS. 4 and 5.

Unlike the first assembly 10 according to the invention, the lining 18 comprises an upper wall 112 at substantially the same height as the upper surface 48 of the tray 12, when the tray 12 is in its idle position.

Furthermore, the guide mechanism 22 comprises, for each insertion member 60, a member 114 for contact with the insertion member 60, ensuring low-friction contact with the insertion member 60.

The contact member 114 is advantageously attached on the lining 18, in particular on an outer surface of the lining 18. It is for example partially inserted into the guide orifice 62.

The contact member 114 is mounted secured in rotation around the axis A-A' on the lining 18.

The insertion member 60 is placed in contact with the contact member 114, advantageously without coming into contact with the vertical wall 24 of the lining 18.

The contact member 114 advantageously has a friction coefficient with the insertion member 60 of less than 0.05.

Thus, the contact member 114 defines a central passage 116 receiving the guide protrusion 72 and a stop surface 118, cooperating with a shoulder 120 present on the insertion member 60. The shoulder 120 slides on the stop surface 118 during the rotation of the insertion member 60 around its axis.

Furthermore, in this example, the lower partition 76 is substantially planar and defines a bead 120 for gripping the lower surface 50 of the tray 20.

The operation of the second rear assembly 110 according to the invention is also similar to that of the first rear assembly 10.

A third assembly 150 according to the invention is illustrated by FIGS. 6 to 8.

Unlike the first rear assembly 10, each insertion member 60 comprises at least one guide protrusion 72 that is off-centered relative to the transverse axis A-A'.

In a corresponding manner, as illustrated by FIG. 8, each lining 18 defines, for each guide protrusion 72, a guide orifice 62 that is off-centered relative to the transverse axis A-A'.

In the example shown in FIGS. 6 to 8, each insertion member 60 comprises two off-centered guide protrusions 72, positioned diametrically opposite one another.

In this example, each guide protrusion 72 has a curved shape. It comprises a tab 152 inserted into an orifice 62 and a retaining head 154 protruding transversely relative to the tray 152 outside the orifice 62, opposite the stirrup 68 relative to the wall 24.

The head 154 thus forms a retaining member 64 for retaining the insertion member 60 in the lining 18.

Each orifice 62 is in the form of a curved slot 156. The ends of the slot 156 form stops limiting the angular travel of the insertion member 60 around the transverse axis A-A'.

In this example, each protrusion 72 thus constitutes a slug of an assembly 66 for limiting the angular travel of the insertion member 60 and the orifice 62 constitutes a corresponding groove of the limiting assembly 66.

The operation of the third rear assembly 120 according to the invention is also similar to that of the first assembly 10.

In one alternative (not shown), the guide mechanism 22 comprises an elastic bias member, inserted between at least one insertion member 60 and the lateral lining 18, supporting that member 60. The elastic biasing member is able to recall the insertion member 60 into the configuration keeping the tray 20 in its idle position.

Thus, when the tray 20 is in an inclined position, the elastic bias member biases the insertion member 60 and the tray 20 mounted on that member 60 in order to drive the rotation of the insertion member 60 toward the configuration keeping the tray 20 in the idle position.

The invention claimed is:

1. A rear assembly for a motor vehicle, comprising:
at least one lateral lining, intended to laterally delimit a motor vehicle trunk;
a tray for supporting objects, having a front edge, a back edge, a left edge and a right edge,
a guide mechanism for guiding the rotation of the tray around a transverse axis, relative to the lateral lining;
wherein:
no element of the tray protrudes laterally from its left edge or its right edge to be engaged in the lateral lining, and
for each lateral lining, the guide mechanism comprises an insertion member for at least one of the edges of the tray, the insertion member being rotatably mounted around the transverse axis on the lateral lining.

2. The rear assembly according to claim 1, wherein the insertion member comprises a stirrup delimiting an insertion passage for inserting one end of the tray.

3. The rear assembly according to claim 2, wherein the stirrup delimits an upper surface and a lower surface defining the insertion passage between them, the tray being able to be gripped between the upper surface and the lower surface.

4. The rear assembly according to claim 1, wherein the insertion member protrudes transversely toward the inside of the trunk relative to the lateral lining.

5. The rear assembly according to claim 1, wherein the guide mechanism defines a transverse guide orifice arranged through the lateral lining, the insertion member comprising at least one guide protrusion engaged through the through orifice.

6. The rear assembly according to claim 5, wherein the guide protrusion extends along the transverse axis.

7. The rear assembly according to claim 5, wherein the guide protrusion is off-centered relative to the transverse axis.

8. The rear assembly according to claim 1, wherein the guide mechanism comprises a transverse retaining member for retaining the insertion member on the lateral lining.

9. The rear assembly according to claim 1, wherein the guide mechanism comprises an limiting assembly for limiting the rotational travel of the insertion member around the transverse axis.

10. The rear assembly according to claim 1, wherein the insertion member is rotatably mounted around the transverse axis between a configuration keeping the tray in an idle position, in which the tray is substantially horizontally maintained, and a configuration for keeping the tray in a position for accessing the trunk, in which the tray is inclined relative to the horizontal.

11. The rear assembly according to claim 1, wherein the guide mechanism comprises a contact member for contact with the insertion member, mounted stationary on the lateral lining.

12. The rear assembly according to claim 1, wherein at least one of the edges of the tray is engaged in each insertion opening such that said edge can be released.

13. The rear assembly according to claim 1, comprising two opposite lateral linings, delimiting the trunk between them, the guide mechanism comprising two members for inserting at least one of the edges of the tray, each insertion member being rotatably mounted around the transverse axis on a respective lateral lining.

14. The rear assembly according to claim 13, wherein at least one of the edges of the tray is engaged in each insertion opening such that said edge can be released, and wherein the tray comprises a first corner inserted into a first insertion member and a second corner inserted into a second insertion member.

15. A motor vehicle, comprising a rear assembly comprising:
at least one lateral lining, intended to laterally delimit a motor vehicle trunk;
a tray for supporting objects, having a front edge, a back edge, a left edge and a right edge,
a guide mechanism for guiding the rotation of the tray around a transverse axis, relative to the lateral lining;
wherein:
no element of the tray protrudes laterally from its left edge or its right edge to be engaged in the lateral lining, and
for each lateral lining, the guide mechanism comprises an insertion member for at least one of the edges of the tray, the insertion member being rotatably mounted around the transverse axis on the lateral lining.

16. The rear assembly according to claim 3, wherein the stirrup defines a front axial stop surface for the tray.

17. The rear assembly according to claim 10, wherein the guide mechanism comprises an elastic biasing member for biasing the insertion member toward its idle position.

18. The rear assembly according to claim 11, wherein the contact member has a friction coefficient with the insertion member of less than 0.05.

19. The rear assembly according to claim 1, wherein the tray is selectively removable from the guide mechanism; and
   wherein the left edge and right edge of the tray each delimit a maximum lateral extension of the removable tray such that the lateral lining is laterally spaced away from an adjacent one of the left edge or right edge of the tray when the tray is received in the guide mechanism.

20. The rear assembly according to claim 19, wherein the guide mechanism defines a transverse guide orifices extending laterally through the lateral lining to receive the adjacent one of the left edge or right edge of the tray;
   wherein the insertion member comprises at least one guide protrusion engaged through the through orifice, and the guide protrusion extends along the transverse axis away from the guide orifice.

\* \* \* \* \*

UNITED STATES PATENT AND TRADEMARK OFFICE
CERTIFICATE OF CORRECTION

PATENT NO. : 9,598,020 B2
APPLICATION NO. : 14/433534
DATED : March 21, 2017
INVENTOR(S) : David Rolain Page 1 of 1

It is certified that error appears in the above-identified patent and that said Letters Patent is hereby corrected as shown below:

On the Title Page

Under "PCT Filed", "Apr. 10, 2013" should read --October 4, 2013--.

Signed and Sealed this
Twenty-third Day of October, 2018

Andrei Iancu
*Director of the United States Patent and Trademark Office*